United States Patent

Hara et al.

[11] Patent Number: 5,907,733
[45] Date of Patent: May 25, 1999

[54] EXPOSING APERTURE DEVICE FOR A CAMERA

[75] Inventors: Toyoyuki Hara; Kazuhito Nakagomi, both of Yamanashi-ken, Japan

[73] Assignee: Nisca Corporation, Yamanashi-ken, Japan

[21] Appl. No.: 08/975,691

[22] Filed: Nov. 21, 1997

[51] Int. Cl.$^6$ .................................................. G03B 9/02
[52] U.S. Cl. ................................................................ 396/505
[58] Field of Search ................................. 396/486, 485, 396/490, 488, 487, 489, 484, 483, 450, 505

[56] References Cited

U.S. PATENT DOCUMENTS 3,228,315   1/1966   Platt ........................................ 396/485

FOREIGN PATENT DOCUMENTS

| 331831 | 2/1991 | Japan . |
| 3-145630 | 6/1991 | Japan . |
| 7-41532 | 7/1995 | Japan . |
| 07295028 | 11/1995 | Japan . |
| 08019239 | 1/1996 | Japan . |
| 08304873 | 11/1996 | Japan . |

*Primary Examiner*—W. B. Perkey
*Attorney, Agent, or Firm*—Kane,Dalsimer,Sullivan, Kurucz, Levy, Eisele and Richard, LLP

[57] ABSTRACT

In an exposing aperture device having a pair of exposing diaphragms which are moved in opposite directions while being guided by guide members formed on a base plate, the guide members are each formed of a vertical rising part with a first contact protrusion coming into point contact with the diaphragms and a horizontal ledge part with a second contact protrusion being in point contact with the diaphragms. By projecting the first and second contact protrusions more than burrs which are inevitably left on the rising part and ledge part as the result of forming the base plate by a punching process or a resin molding process, the exposing diaphragms can be moved smoothly and stably to control exposure with a high accuracy without being affected by the burrs.

12 Claims, 8 Drawing Sheets

EXPOSING APERTURE DEVICE FOR A CAMERA

BACKGROUND OF THE INVENTION

1. Field of the Invention

This invention relates to an exposing aperture device for controlling exposure by moving diaphragms in a video camera and so on, and more particular to a structure capable of warranting high accurate exposing operation of the elements constituting an exposing aperture without being affected by undesirable factors such as burrs and molding flashes which are inevitably formed on a base plate for supporting the diaphragms as a result of making the base plate by a punching or molding process.

2. Description of the Prior Art

In general, an exposing aperture device for controlling exposure in a video camera and so forth, which is usually incorporated between lenses arranged along an optical axis in a lens tube and an image pick-up means such as a CCD image sensor, has a pair of exposing diaphragms movable in opposite directions relative to an exposing aperture formed around the optical axis in order to adjust quantity of light passing through the aperture.

As recent video cameras have come to enjoy remarkably improved properties, the exposing aperture devices incorporated in the video cameras are required to not only form an apposite aperture with a high accuracy, but also perform stable and smooth exposing operation instantaneously in response to the change of the quantity of light from a subject. Thus, the exposing diaphragms are desired to be made light and small in inertial mass and work accurately so as not to involve undesirable factors affecting the movement of the diaphragms.

In Japanese Patent Application Public Disclosures Nos. HEI 3-31831(A), HEI 3-145630(A), and HEI 7-295028(A), and Japanese Utility Model Appln. Public Discl. Nos. SHO 59-4524(A), and HEI 7-41532(A), exposing aperture devices of this type are disclosed.

The conventional exposing aperture device for use in a video camera, as typically disclosed in Japanese Utility Model Appln. Pub. Disclosure No. SHO 59-4524(A), comprises a base plate having an exposing aperture formed around the optical axis and pin-like diaphragm guide members, a pair of exposing diaphragms having guide slots which receive the guide members so as to be movable in opposite directions away from the exposing aperture, and a drive means for moving the exposing diaphragms.

The parallel movement of the diaphragms is ensured by a guiding structure composed of the guide members planted on the base plate and the guide slots or grooves formed in the diaphragms. By the guiding structure, the diaphragms can be stably moved to and fro relative to the exposing aperture without wobbling nor snaking.

The guiding structure in which the guide members such as pins are inserted into the guide slots as found in the aforementioned conventional exposing aperture device enjoys high operating performance and proves advantageous from the standpoint of a space factor in comparison with an aperture device disclosed in Japanese Patent Appln. Pub. Disclosure No. HEI 8-19239(A), in which the diaphragms are held between outside guide members.

The base plate is provided on its surface confronting the diaphragm with one or more longitudinal ribs so as to come into contact with the diaphragm as little as possible, thus to heighten the moving efficiency of the diaphragm.

In most cases, the base plate is generally produced by a punching method, a resin molding method or the like. In case where the base plate is punched out of sheet metal by using a punching press, serrate shaped burrs are inevitably left on the sheared edge of the base plate. The film-like light and thin diaphragm is caught and sensitively affected by the burrs on the edge of the base plate to no small extent when moving on the base plate, consequently to degrade the exposing accuracy of the camera. The base plate produced by the resin molding method might lead to the same problem.

To solve the matter, the burrs resulting from punching or molding may be removed by hand, but such a onerous handwork to remove the burrs consumes much time and labor and entails a decline in productivity of the exposing aperture device. Under these circumstances, there has been a great need for a high-performance aperture device in a field of optics, which can easily produced and stably and accurately operate without being affected by undesirable factors such as the burrs inevitably left on the base plate.

OBJECT OF THE INVENTION

An object of the present invention is to provide a high-performance exposing aperture device for use in a camera, which has a diaphragm guiding structure capable of efficiently operating exposing diaphragms with a high accuracy, thus to heighten the exposing accuracy of the camera.

Another object of the present invention is to provide an exposing aperture device easy to manufacture, in which exposing diaphragms can be moved smoothly to control exposure with a high accuracy without being affected by undesirable factors such as burrs formed on a base plate for supporting the diaphragms.

Still another object of the present invention is to provide an exposing aperture device having exposing diaphragms can be stably operated without being easily disengaged from the device due to a shock or vibration.

SUMMARY OF THE INVENTION

To attain the objects described above according to the present invention, there is provided an exposing aperture device comprising a base plate having an exposing aperture and diaphragm guide members, a pair of exposing diaphragms having sliding slots which receive the guide members on the base plate so as to move in parallel along the guide members, and a drive means for moving the diaphragms in opposite directions to open and close the exposing aperture. Each diaphragm guide member has a rising part with a contact protrusion which comes into point contact with the inner surface of the sliding slot to slidably guide the diaphragm in motion. The diaphragm guide member further has a ledge part extending perpendicularly from the top of the rising part.

The base plate is formed by a punching process, a resin molding process or the like. The contact protrusion on the rising part is made larger than the height of burrs which are inevitably left on the sheared edge of the base plate as the result of undergoing the punching process or resin molding process.

In case where the burrs are formed on the edge of the ledge part, the ledge part may be provided with a contact protrusion which is made larger than the height of the burrs so as to come into direct contact with the upper surface of the exposing diaphragm to slidably guide the diaphragm without contacting the burrs.

Since the diaphragm is out of contact with the burrs or other undesirable factors which are inevitably left on the base plate as the result of forming the base plate by punching or resin molding, the exposing diaphragms can be smoothly and stably moved without being affected by undesirable factors such as burrs formed on a base plate, thus to effect apposite exposure with a high accuracy and perform a stable and smooth exposing operation in a camera.

Other objects and features of the present invention will be described hereinafter in detail with reference to the accompanying drawings.

DESCRIPTION OF THE PREFERRED EMBODIMENTS

An exposing aperture device according to this invention can stably execute an accurate exposing action in a video camera and so on without being affected by undesirable factors resulting from formation of the component parts of the device.

As shown in FIG. 1 through FIG. 7, the exposing aperture device of the invention comprises a base plate 10, a lower exposing diaphragm 20 slidably supported by the base plate 10, an upper exposing diaphragm 30 slidably supported on the lower exposing diaphragm 20 by the base plate 10, and a drive means 40 for moving the lower exposing diaphragm 20 and upper exposing diaphragm 30 on the base plate 10.

Figure 7:
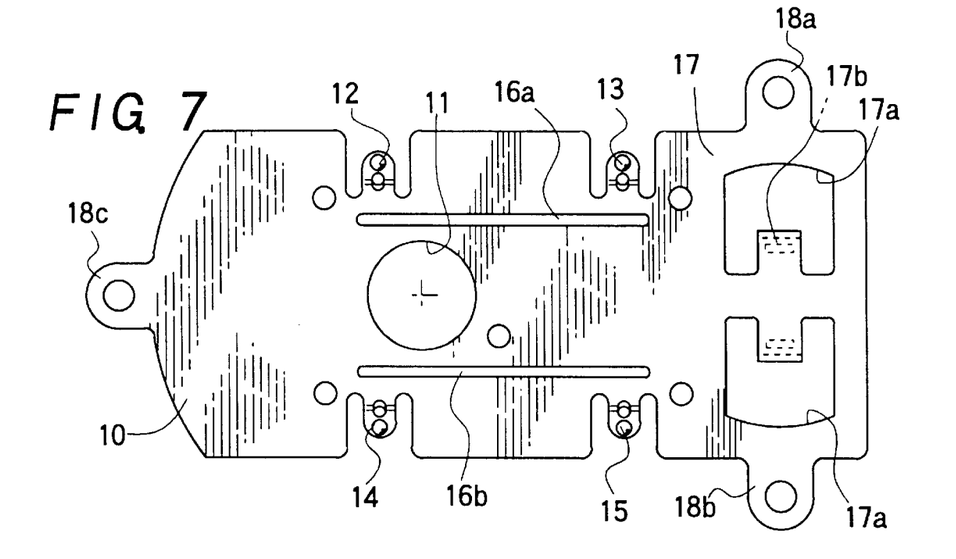
FIG. 7 is a plan view showing a base plate of the device of the invention.

The base plate 10 in this embodiment is shaped in a substantial oblong and has an exposing aperture 11 around an optical axis Ax of a camera into which the device of this invention is incorporated. The lower and upper diaphragms 20 and 30 are moved to and fro in opposite directions symmetrically with respect to the exposing aperture 11.

The base plate 10 is provided on its one longitudinal edge portion with diaphragm guide members 12 and 13 and on the other longitudinal edge portion with diaphragm guide members 14 and 15.

Figure 8:
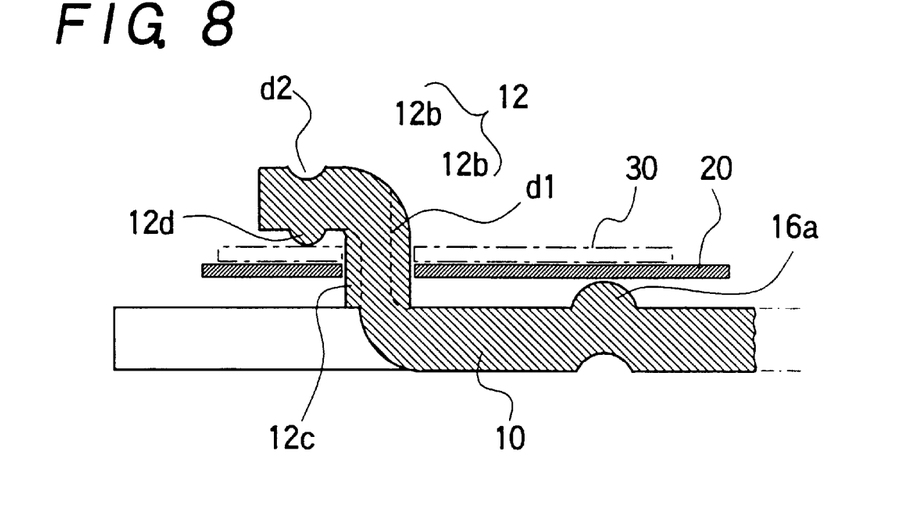
FIG. 8 is a cross-sectional view showing a diaphragm guide member of the device of FIG. 1.
Figure 9:
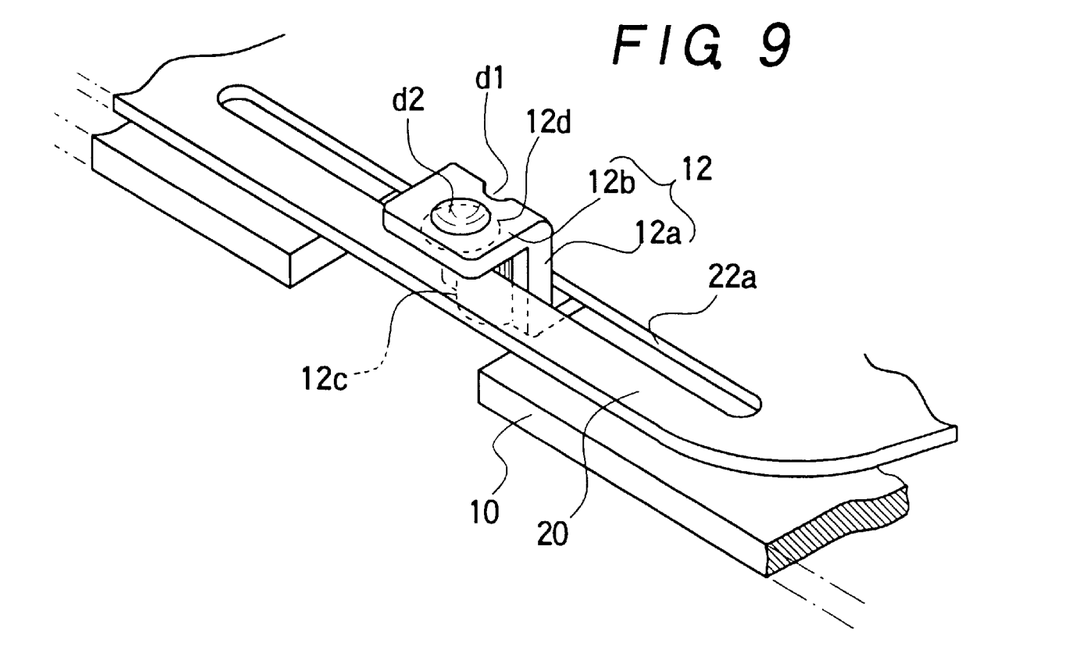
FIG. 9 is a perspective view showing in part the diaphragm guide member and the diaphragm in the assembled state of the device of FIG. 1.

The diaphragm guide members 12–15 are each formed of perpendicularly rising parts 12a, 13a, 14a and 15a, and ledge parts 12b, 13b, 14b and 15b extending outwardly from the top of the rising parts 12a–15a, i.e. it assumes a generally L shape on the whole. Although only the guide member 12 is shown in FIGS. 8 and 9, the other guide members 13–15 are identical with the illustrated guide member 12.

From outside guide surfaces of the rising parts 12a–15a, first contact protrusions 12c, 13c, 14c and 15c protrude in parallel to the base plate 10, respectively, through which the guide members 12–15 come into point contact with the diaphragms 20 and 30. From the lower guide surfaces of the rising parts 12b–15b, second contact protrusions 12d, 13d, 14d and 15c protrude downward perpendicularly to the base plate 10, so as to allow the contact protrusions of the ledge parts to come into point contact with the diaphragms 20 and 30.

On the base plate 10, there are formed longitudinal ribs 16a and 16b so that the lower diaphragm 20 can smoothly slide on the base plate 10 with little frictional resistance.

One end part of the base plate 10 serves as a mounting portion 17 to secure the drive means 40. The mounting portion 17 has holes 17a, and holding pieces 17b for holding the drive means 40.

Reference numerals 18a, 18b and 18c denote fitting tongues with which the aperture device of the invention is fixed to a camera and so forth.

Figure 6:
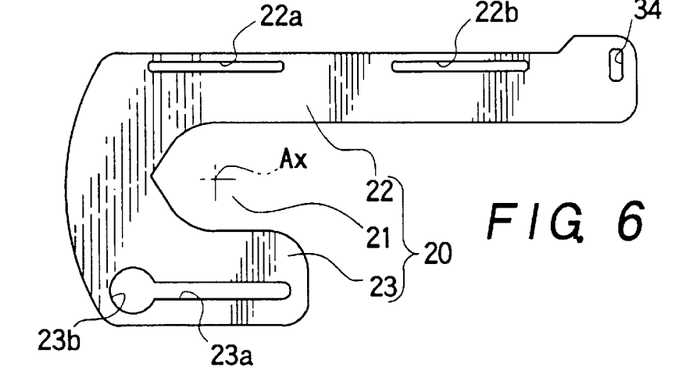
FIG. 6 is a plan view showing a lower diaphragm of the device of the invention.

The lower diaphragm 20 is made of a metal sheet or other sheet-like material, and as shown in FIG. 6, has an aperture opening 21, which is open in one direction (rightward in the drawing), a long-side part 22 with sliding slots 22a and 22b extending in the same direction, and a short-side part 23 with a sliding slot 23a parallel to the sliding slots 22a and 22b, and a through hole 23b which has a larger diameter than the ledge part 14b of the guide member 14 so as to allow the guide member 14 to pass therethrough and is placed at one end of the sliding slot 23a.

The lower diaphragm 20 is mounted on the base plate 10 by first inserting the guide members 12 and 13 on the base plate 10 into the slots 22a and 22b in the lower diaphragm 20, and then, inserting the guide member 14 into the slot 23a through the through hole 23b. In the mounted state of the lower diaphragm 20 on the base plate 10, the lower diaphragm 20 is movable on the base plate 10 in the longitudinal direction (sliding direction) of the base plate, while being guided by the guide members 12–14, and the aperture opening 21 of the diaphragm 20 is put in registration with the exposing aperture 11 in the base plate 10 partly or entirely.

Although the lower diaphragm 20 has three sliding slots 22a, 22b and 23a in this embodiment, the number of the sliding slots is not specifically limited.

The widths of the sliding slots 22a and 22b in the lower diaphragm 20 are substantially equal to the thickness of the rising parts 12 and 13 including the first contact protrusions 12c and 13c, respectively, but the width of the sliding slot 23a is somewhat larger than the thickness of the rising part 14 including the first contact protrusion 14c so as to permit an error in measurement in forming the base plate 10.

The lower diaphragm 20 further has a driving slot 24 extending perpendicular to the sliding direction of the diaphragm in the free end portion (right end portion in the drawing) of the long-side part 23 thereof.

Figure 5:
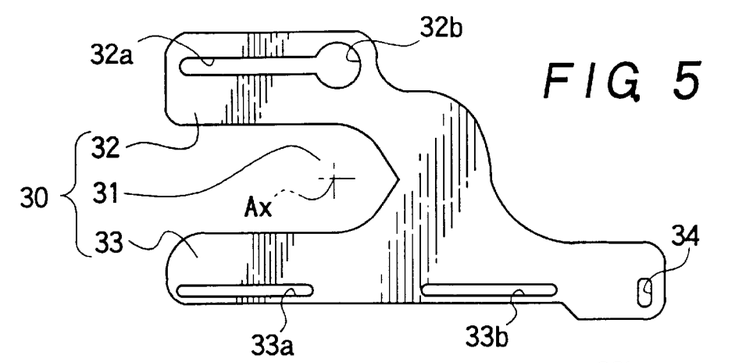
FIG. 5 is a plan view showing an upper diaphragm of the device of the invention.

Similarly to the lower diaphragm 20, the upper diaphragm 30 is made of a metal sheet or other sheet-like material, and as shown in FIG. 5, has an aperture opening 31, which is open in one direction (leftward in the drawing) opposite to that in which the aperture opening 21 of the lower diaphragm 20 opens, a short-side part 32 with a sliding slot 32a extending longitudinally, and a long-side part 33 with sliding slots 33a and 33b extending in the same direction in parallel to the sliding slot 32a. In the upper diaphragm 30, there is further formed a through hole 32b larger in diameter than the ledge part 12b of the guide member 12 so as to allow the guide member 12 to pass therethrough. The through hole 32b is placed at one end of the sliding slot 32a.

The upper diaphragm 30 is mounted on the base plate 10 through the lower diaphragm 20 by first inserting the guide members 14 and 15 on the base plate 10 into the slots 33a and 33b in the upper diaphragm 30, and then, inserting the guide member 12 into the slot 32a through the through hole 32b. In the mounted state of the upper diaphragm 30 on the base plate 10, the upper diaphragm 30 is movable on the base plate 10 in the longitudinal direction (sliding direction) of the base plate 10, while being guided by the guide members 12, 14 and 15, and the aperture opening 31 of the diaphragm 30 coincides with the exposing aperture 11 in the base plate 10 partly or entirely.

Although the upper diaphragm 30 has three sliding slots 32a, 33a and 33b in this embodiment, the number of these sliding slots is not specifically limited.

The widths of the sliding slots 33a and 33b in the upper diaphragm 30 are substantially equal to the thickness of the rising parts 14 and 15 including the first contact protrusions 14c and 15c, respectively, but the width of the sliding slot 32a is somewhat larger than the thickness of the rising part 12 including the first contact protrusion 12c so as to permit an error in measurement in forming the base plate 10.

The upper diaphragm 30 further has a driving slot 34 extending perpendicular to the sliding direction of the diaphragm in the free end portion (right end portion in the drawing) of the long-side part 33 thereof.

Figure 10:
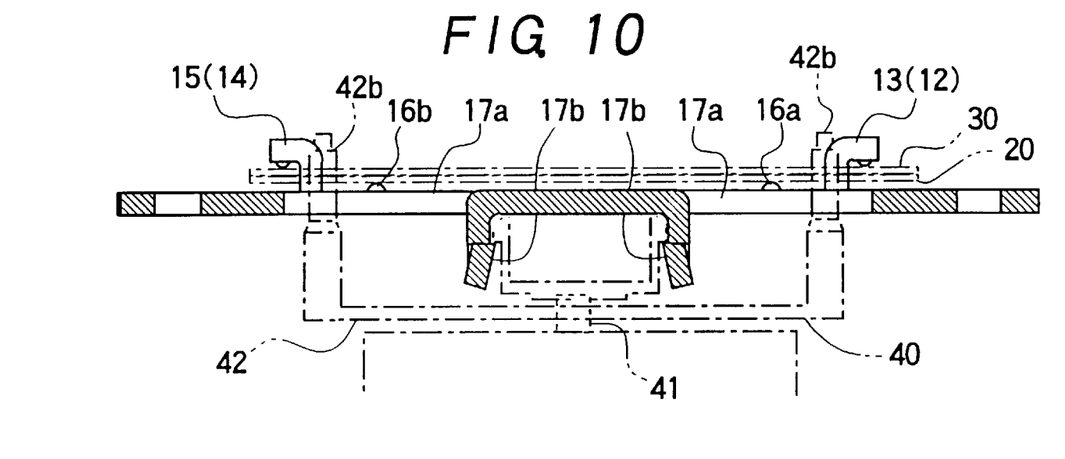
FIG. 10 is a cross-sectional view taken on line X—X in FIG. 2.

The drive means 40 is a kind of electric motor, and as schematically shown in FIG. 10, includes a rotary shaft 41, a rotor 42 provided at its both ends with actuating pins 42a and 42b, and an electromagnetic coil 43 for actuating the rotary shaft 41. The drive means 40 is secured onto the lower surface of the base plate 10 with the holding pieces 17b bent downward from the base plate 10, and the actuating pins 42a and 42b extending upward from the both ends of the rotor 42 are stuck upward through the driver holes 17a in the base plate 10.

Figure 1:
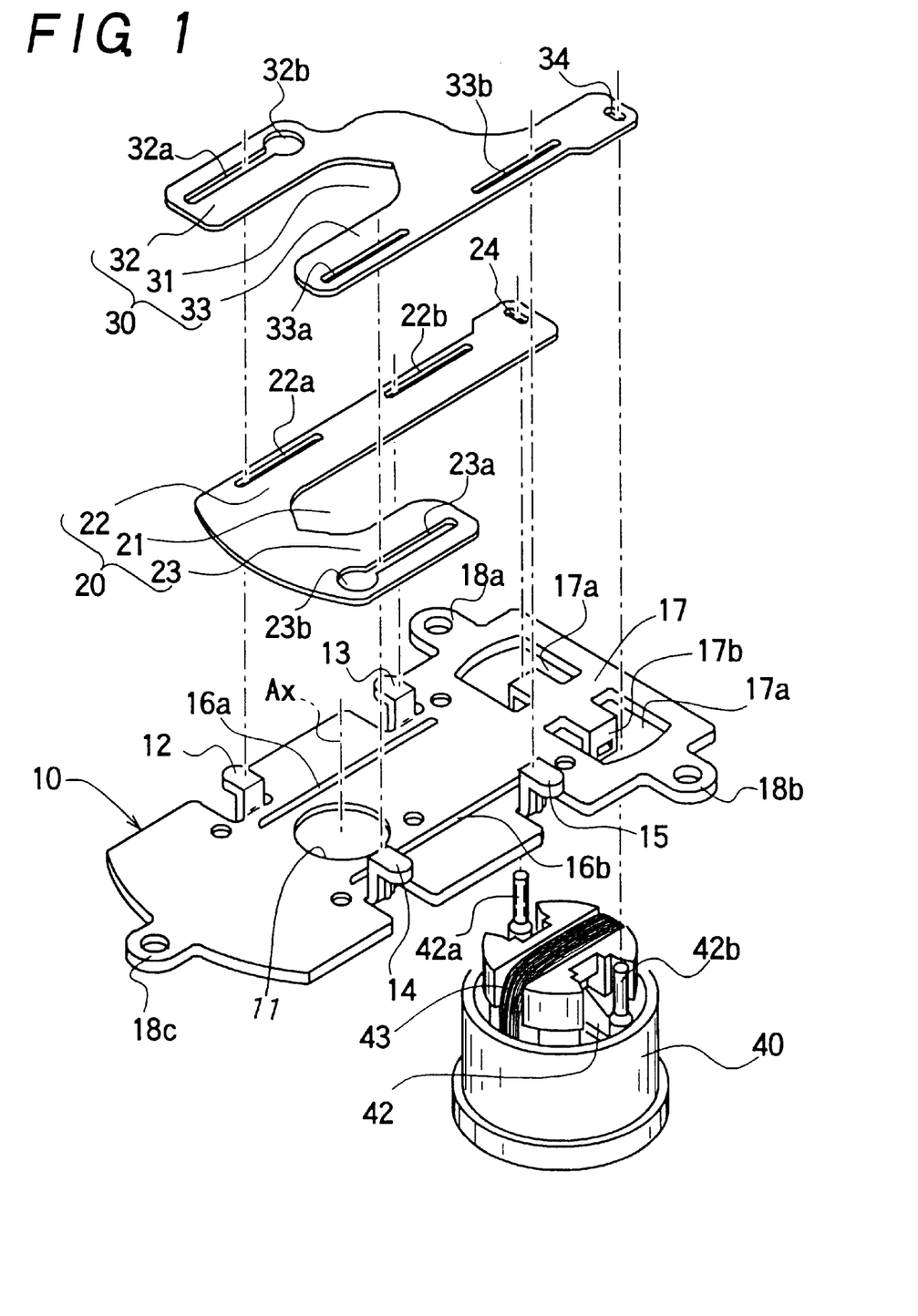
FIG. 1 is an exploded perspective view schematically showing one embodiment of an exposing aperture device according to this invention.
Figure 2:
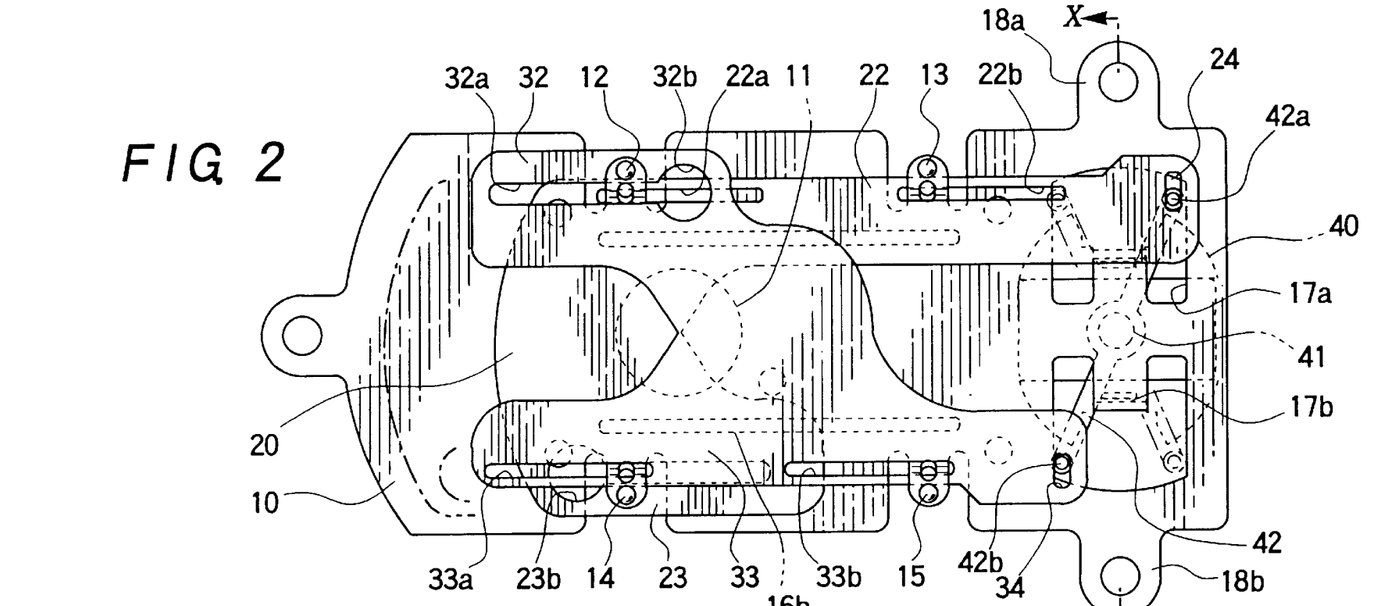
FIG. 2 is a plan view showing the device of FIG. 1, in its aperture-closed state.
Figure 3:
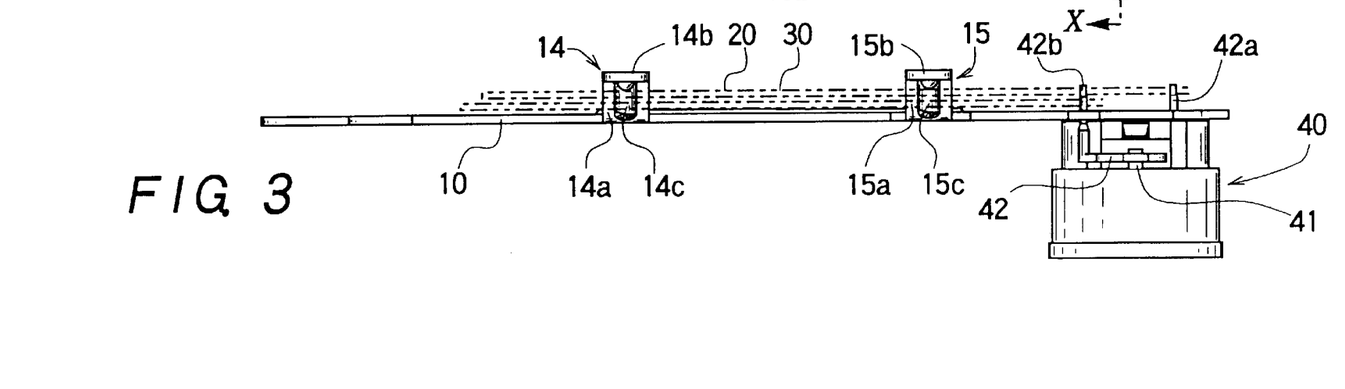
FIG. 3 is a side view showing the device of FIG. 1.

As shown in FIG. 2, one of the actuating pins, 42a, is inserted in the driving slot 24 in the lower diaphragm 20, and the other actuating pin 42b is inserted in the driving slot 34 in the upper diaphragm 30. Thus, by exciting the electromagnetic coil 43 in accordance with a desired exposure, the rotor 42 rotates to impart a circular motion to the respective actuating pins 42a and 42b, so that the lower and upper diaphragms 20 and 30 are moved in opposite directions in parallel while being guided by the guide members 12–15, thus causing the lower and upper diaphragms 20 and 30 to partially overlap each other or away from each other.

Figure 4:
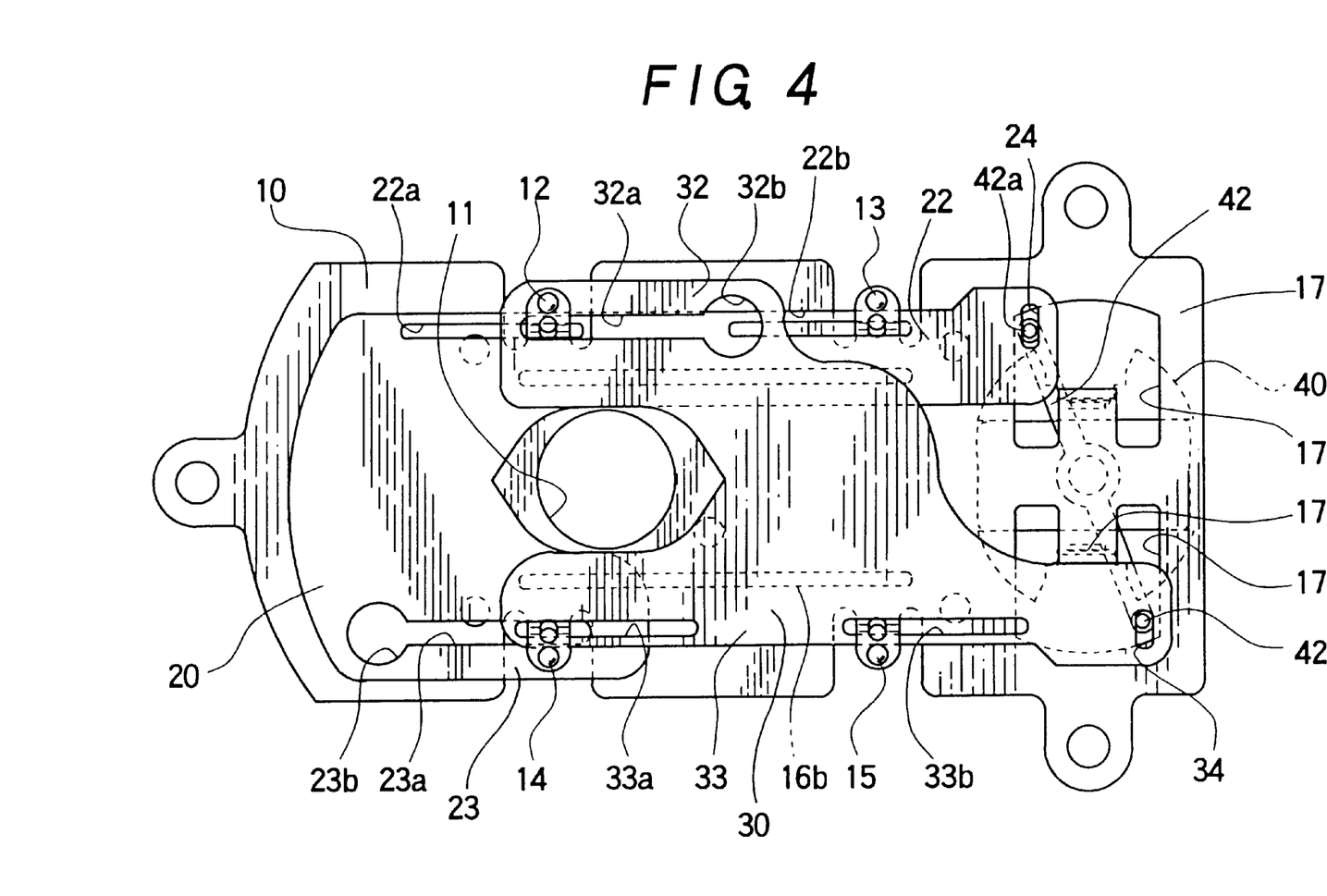
FIG. 4 is a plan view showing the device of FIG. 1, in its aperture-open state.

Therefore, by changing an electric current to be applied to the electromagnetic coil 43 of the drive means 40 in accordance with the desired exposure, the lower and upper diaphragms 20 and 30 can be consecutively and arbitrarily changed between the closed state in which the exposing aperture 11 is completely closed (zero-exposure state as shown in FIG. 2) and the open state in which the exposing aperture 11 is completely opened (open exposure state as shown in FIG. 4).

Figure 11:
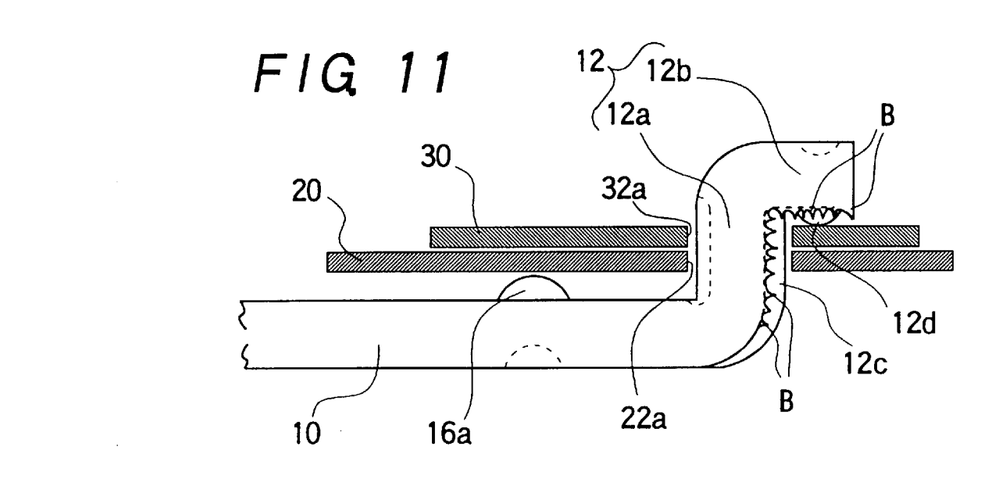
FIG. 11 is a conceptual diagram explanatory of the function of the diaphragm guide member of this invention.

In case where the base plate 10 is formed by punching out sheet metal in a punching process or molded by a resin molding process, serrate-shaped burrs B are inevitably left on the sheared edge or parted edge of the base plate, as somewhat exaggeratedly illustrated in FIG. 11. That is to say, when the base plate is formed by punching a sheet metal from the lower side with a punching tool, the burrs B are left on the outer edges of the rising part 12a and the lower edges of the ledge part 12b. Although only the guide member 12 is shown in FIG. 11, the other guide members 13–15 are similar with the illustrated guide member 12.

Ordinarily, the light and thin diaphragm in moving on the base plate are caught and sensitively affected by the burrs formed on the edge of the base plate, consequently to degrade the exposing accuracy of the camera. To overcome such unfavorable conditions, in the device according to this invention, the first contact protrusion 12c of the rising part 12a and the second contact protrusion 12d of the ledge part 12b of the guide member 12 are respectively projected more than the burrs B, as illustrated, so as to prevent the inner surfaces of the slots 22a and 32a of the diaphragms 20 and 30 from touching the burrs B. Namely, the first and second contact protrusions 12c and 12d may be made sufficiently large in comparison with the burrs B. Consequently, the exposing diaphragms 20 and 30 can be moved smoothly and stably to control exposure with a high accuracy without being affected by the burrs B formed on a base plate 10.

There are formed depressions d1 and d2 in the inside surfaces of the rising parts 12a–15a and the upper surfaces of the ledge parts 12b–15b as the result of punching, but these depressions are not indispensable for this invention.

Although the explanation of only the relationship between the slots 22a and 32a in the diaphragms 20 and 30 and the guide member 12 has been made here, the same is true for the slots 22b, 23a, 32b and 33a in conjunction with the other guide members. Likewise, when forming the base plate by a resin molding process, the burrs come into existence along the parting lines of the molded base plate. Thus, the conception of the invention is applied to the device having a base plate molded of synthetic resin.

In case where the sheet metal is punched out upwardly from the lower side with a punching tool conversely, thereby to form burrs on the inner edges of the rising parts 12a–15a, the first contact protrusions 12c–15c to be formed on the rising parts 12a–15a may be projected inwardly more than the burrs in the same manner.

According to the aforementioned embodiment, the lower and upper diaphragms 20 and 30 can be smoothly and stably moved in opposite directions to adjust the exposing aperture with a high accuracy by driving the drive means 40 in accordance with the desired exposure. The exposing action of the diaphragms 20 and 30 are not affected by the burrs at all, consequently to obtain the proper exposure.

Figure 12:
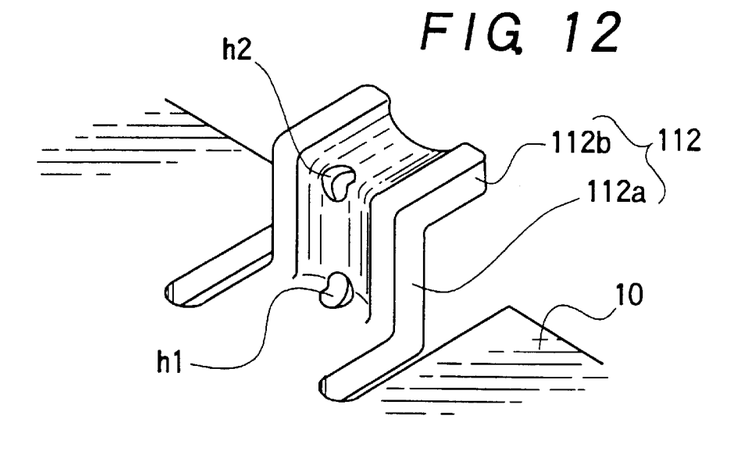
FIG. 12 is a perspective view showing in part another embodiment of this invention.
Figure 13:
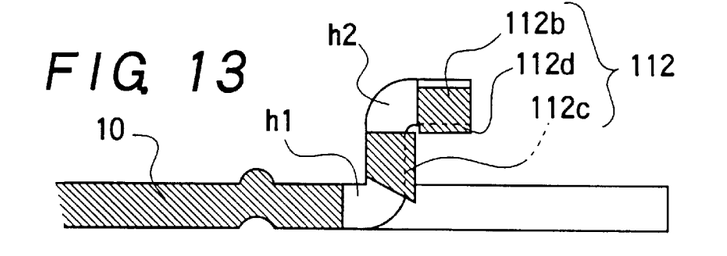
FIG. 13 is a cross-sectional view of FIG. 12.

FIG. 12 and FIG. 13 show another embodiment wherein a first contact protrusion 112c and a second contact protrusion 112d are continuously formed in a substantially L shape on a rising part 112a and a ledge part 112b of a diaphragm guide member 112. The base plate 10 having four guide members of the same structure can readily be produced by a punching method or a resin molding method. By forming small holes in two bent portions of the guide member 112, the guide member can be accurately bent with ease at right angles in carrying out a punching process. Other component parts constituting the aperture device of the invention are identical with those of the first embodiment described above.

The device having the aforenoted structure can achieve a marked effect of stably and smoothly moving the diaphragms to control exposure with a high accuracy, similarly to the foregoing first embodiment.

Figure 14:
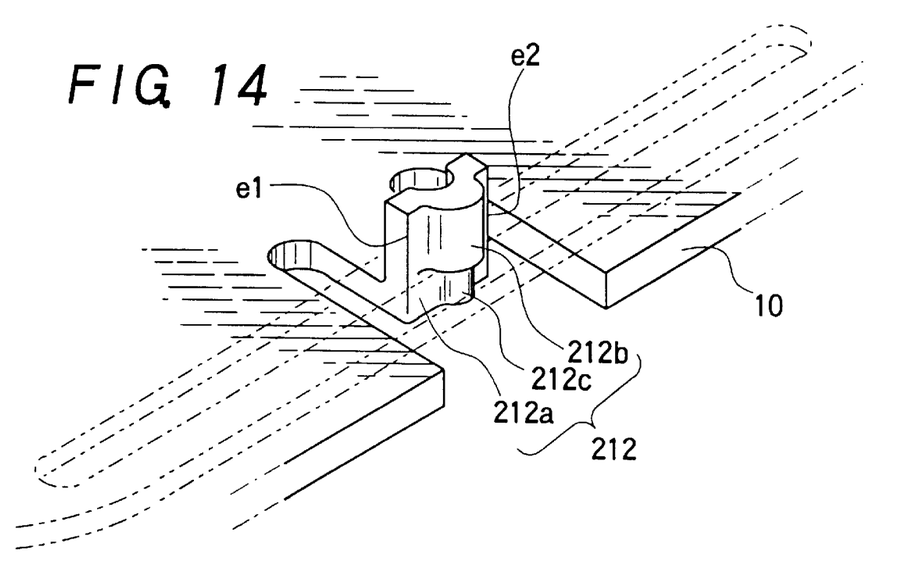
FIG. 14 is a perspective view showing in part still another embodiment of this invention.

FIG. 14 shows still another embodiment in which the base plate 10 having a guide member 212 formed of sheet metal by a punching method, though it is possible to make the base plate 10 of synthetic resin by a resin molding method. The guide member 212 in this embodiment is formed of a rising part 212a of a guide member 212 has a contact protrusion 212c, and a ledge part 212b formed in a substantially semicylindrical shape and protruding more than the contact protrusion 212c. Also in this embodiment, the contact protrusion 212c projects more than burrs formed on both edges e1 and e2 of the outside surface of the rising part 212a. Thus, the exposing diaphragms can be smoothly and stably moved without being affected by the burrs left on the guide members.

Figure 15A:
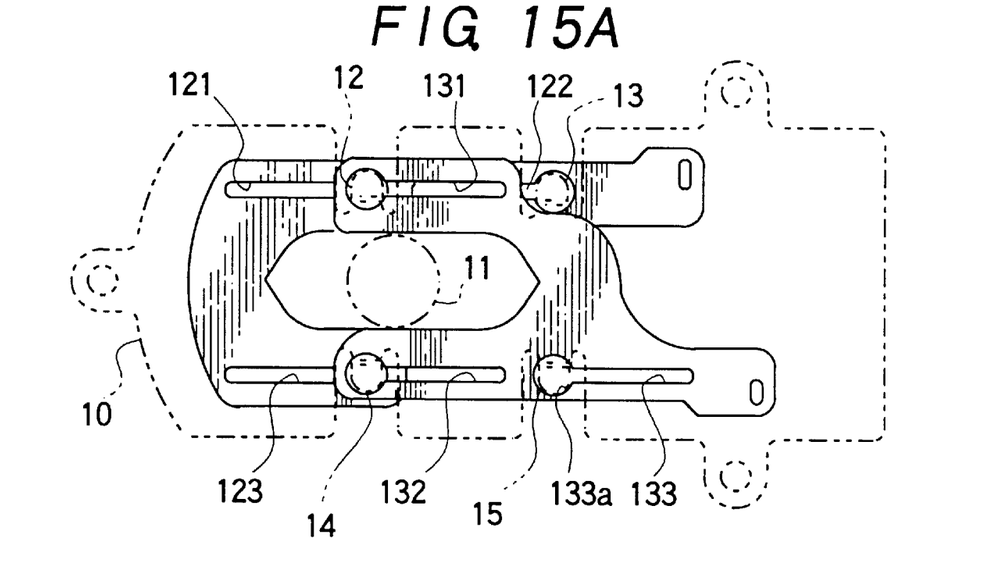
FIGS. 15A and 15B are plan views showing yet another embodiment of this invention.
Figure 15B:
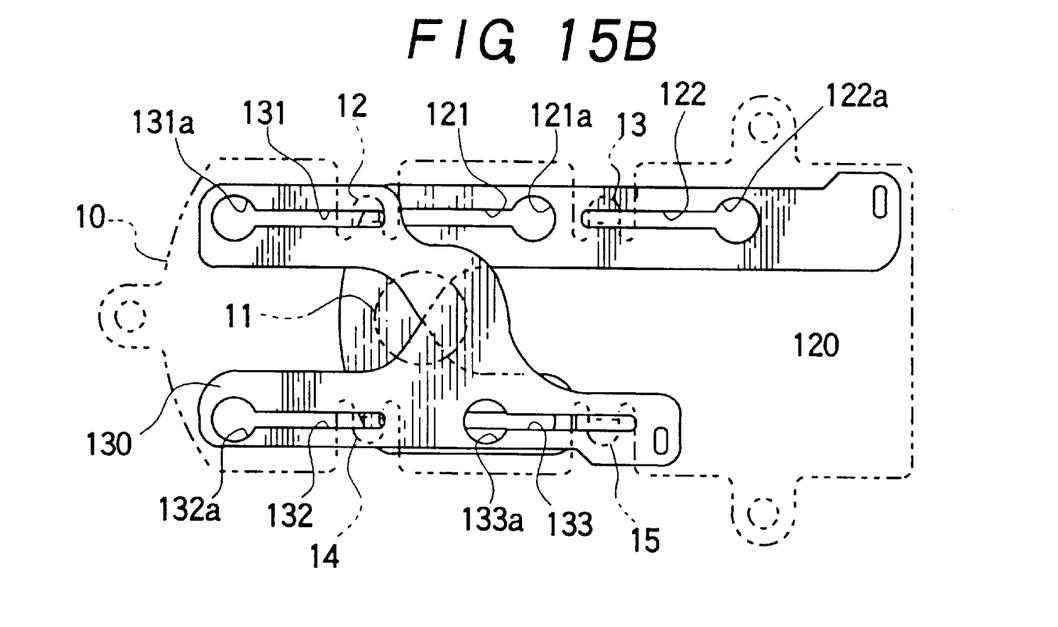

FIGS. 15A and 15B show a further embodiment in which the lower and upper exposing diaphragms 120 and 130 can easily be assembled on the base plate 10. In this embodiment, the lower diaphragm 120 has sliding slots 121, 122 and 123 equal to those 22a, 22b and 23a of the lower diaphragm 20 in the first embodiment, and through holes 121a, 122a and 123a continuous with the respective slots 121, 122 and 123. On the other hand, the upper diaphragm 130 has sliding slots 131, 132 and 133 equal to those 32a, 33a and 33b of the upper diaphragm 30 in the first embodiment, and through holes 131a, 132a and 133a continuous with the respective slots 131, 132 and 133. Each through hole (121a, 122a, 123a) in the lower diaphragm 120 is located at one end (right end in the drawings) of the corresponding sliding slot (121, 122, 123) relative to the sliding direction. Each through hole (131a, 132a, 133a) in the upper diaphragm 130 is located at the other end (left end in the drawings) of the corresponding sliding slot (131, 132, 133) relative to the sliding direction. That is, the through holes 121a, 122a and 123a in the lower diaphragm 120 are located at the opposite ends of the slots to the ends of the slots in the upper diaphragm 130, at which the through holes 131a, 132a and 133a are located at the farthest positions from each other when moving the diaphragms 120 and 130 from their open state shown in FIG. 15A to their closed state shown in FIG. 15B.

The lower and upper diaphragms 120 and 130 are assembled on the base plate 10 by first putting the upper diaphragm 130 on top of the lower diaphragm 120 while putting the through holes 121a, 122a and 123a of the lower diaphragm 120 in registration with the through holes 131a, 132a and 133a of the upper diaphragm 130 as shown in FIG. 15A, then inserting the guide members 12–15 into the overlapping through holes of the lower and upper diaphragms 120 and 130, and thereafter, sliding the lower and upper diaphragms 120 and 130 in opposite directions so as to shift the guide members 12–15 from the through holes 121a–123a and 131a–133a to the sliding slots 121–123 and 131–133 in the respective diaphragms 120 and 130 as illustrated in FIG. 15B. Thus, the assembling of the diaphragms on the base plate 10 can easily be accomplished. Besides, it is advantageous that the diaphragms 120 and 130 do not easily come off the base plate 10 even if experiencing shocks or vibrations in use.

As is apparent from the foregoing description, since the diaphragm guide members on the base plate of the aperture device according to this invention each comprises the rising part and the ledge part extending perpendicularly from the top of the rising part, which rising part and ledge part each have the contact protrusion coming into point contact with the diaphragms to slidably guide the sliding slot, the exposing diaphragms can be moved smoothly and stably to control exposure with a high accuracy without being affected by undesirable factors such as burrs formed on a base plate. As a result, the operating performance of the camera can be improved. Furthermore, the aperture device of the invention can easily be assembled and stably operated.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. An exposing aperture device comprising.
   a base plate having an exposing aperture and diaphragm guide members, said base plate having burrs formed along an edge of one side thereof:
   a pair of exposing diaphragms each having sliding slots for receiving said guide members so as to move in parallel along said guide members; and
   a drive means for moving said diaphragms in opposite directions to open and close said exposing aperture in said base plate;
   each of said diaphragm guide members having a rising part with a contact protrusion being in point contact with at least one of said diaphragms, said contact protrusion being formed on said side of said base plate having said burrs and being projected more than said burrs on said base plate.

2. A device as claimed in claim 1, wherein said base plate is formed by a punching or resin molding process which inevitably brings about said burrs on said base plate.

3. A device as claimed in claim 1, wherein said guide members each have a ledge part extending outward from top of said rising part, said ledge part being provided with a contact protrusion being in point contact with at least one of said diaphragms.

4. A device as claimed in claim 3, wherein said base plate is formed by a punching or resin molding process which inevitably brings about burrs on said base plate, and said contact protrusion of said ledge part is projected more than said burrs.

5. A device as claimed in claim 1, wherein at least one of said sliding slots in each of said diaphragms is provided at its one end with a through hole larger than said guide member so as to permit said guide member to pass therethrough.

6. A device as claimed in claim 1, wherein each of said sliding slots in each of said diaphragms is provided at its one end with a through hole larger than said guide member so as to permit said guide member to pass therethrough.

7. A device as claimed in claim 6, wherein said through holes in one of said diaphragms are formed at opposite ends of said slots to the ends of said slots in the other diaphragm.

8. A device as claimed in claim 7, wherein said through holes in one of said diaphragms are located farthest from those of the other diaphragm when said diaphragms assume their aperture-closed state.

9. An exposing aperture device comprising a base plate having an exposing aperture and diaphragm guide members, a pair of exposing diaphragms each having sliding slots for receiving said guide members so as to move in parallel along said guide members, and a drive means for moving said diaphragms in opposite directions to open and close said exposing aperture in said base plate, each of said diaphragm guide members having a rising part with a first contact protrusion being in point contact with at least one of said diaphragms, and a ledge part extending outward from top of said rising part, said ledge part being provided with a second contact protrusion being in point contact with at least one of said diaphragms, said base plate being formed by a punching or resin molding process which inevitably brings about burrs on said base plate, and said first and second contact protrusions being projected more than said burrs.

10. A device as claimed in claim 9, wherein at least one of said sliding slots in each of said diaphragms is provided at its one end with a through hole larger than said guide member so as to permit said guide member to pass therethrough.

11. A device as claimed in claim 9, wherein each of said sliding slots in each of said diaphragms is provided at its one end with a through hole larger than said guide member so as to permit said guide member to pass therethrough.

12. A device as claimed in claim 11, wherein said through holes in one of said diaphragms are formed at opposite ends of said slots to the ends of said slots in the other diaphragm, and located farthest from those of the other diaphragm when said diaphragms assume their aperture-closed state.

* * * * *